United States Patent
Narayanamurthy et al.

(10) Patent No.: US 9,507,800 B2
(45) Date of Patent: Nov. 29, 2016

(54) DATA MANAGEMENT IN DISTRIBUTED FILE SYSTEMS

(71) Applicant: NetApp, Inc., Sunnyvale, CA (US)

(72) Inventors: Srinivasan Narayanamurthy, Bangalore (IN); Gaurav Makkar, Bangalore (IN); Kartheek Muthyala, Bangalor (IN); Arun Suresh, Bangalore (IN)

(73) Assignee: NETAPP, INC., Sunnyvale, CA (US)

( * ) Notice: Subject to any disclaimer, the term of this patent is extended or adjusted under 35 U.S.C. 154(b) by 347 days.

(21) Appl. No.: 14/061,596

(22) Filed: Oct. 23, 2013

(65) Prior Publication Data

US 2015/0112951 A1     Apr. 23, 2015

(51) Int. Cl.
  *G06F 17/30* (2006.01)

(52) U.S. Cl.
  CPC ... *G06F 17/30215* (2013.01); *G06F 17/30132* (2013.01)

(58) Field of Classification Search
  CPC .................. G06F 17/30215; G06F 17/30132
  See application file for complete search history.

(56) References Cited

U.S. PATENT DOCUMENTS

| | | | |
|---|---|---|---|
| 6,119,151 A | 9/2000 | Cantrell et al. | |
| 6,484,177 B1 | 11/2002 | Van Huben et al. | |
| 6,625,604 B2 | 9/2003 | Muntz et al. | |
| 7,120,654 B2 | 10/2006 | Bromley | |
| 7,143,146 B2 | 11/2006 | Nakatani et al. | |
| 8,078,575 B2 | 12/2011 | Mehta et al. | |
| 8,380,666 B2 | 2/2013 | Ejiri | |
| 8,539,174 B2 | 9/2013 | Hahn et al. | |
| 8,788,455 B2 | 7/2014 | Mehta et al. | |
| 8,990,954 B2 | 3/2015 | Cook | |
| 9,092,451 B1 | 7/2015 | Djam et al. | |
| 9,189,495 B1 | 11/2015 | Hughes et al. | |
| 2005/0033749 A1 | 2/2005 | M'Zoughi et al. | |
| 2007/0073990 A1 | 3/2007 | Snaman, Jr. et al. | |
| 2009/0077327 A1* | 3/2009 | Hara | G06F 3/0608 711/154 |
| 2011/0295949 A1 | 12/2011 | Calsyn et al. | |
| 2011/0313973 A1 | 12/2011 | Srivas et al. | |

(Continued)

FOREIGN PATENT DOCUMENTS

| | | |
|---|---|---|
| WO | 2008029146 A1 | 3/2008 |
| WO | 2009005577 A2 | 1/2009 |

OTHER PUBLICATIONS

Leveraging EMC Fast Cache with Oracle OLTP Database Applications, Oct. 2010, pp. 1, 6-8.*

(Continued)

*Primary Examiner* — Albert Phillips, III
(74) *Attorney, Agent, or Firm* — Klein, O'Neill & Singh, LLP (57) ABSTRACT

Technology is disclosed for managing data in a distributed processing system ("the technology"). In various embodiments, the technology pushes "cold" data from a primary storage of the distributed processing system to a backup storage thereby maximizing the usage of the space on the primary storage to store "hot" data on which most data processing activities are performed in the distributed processing system. The cold data is retrieved from the backup storage into the primary storage on demand, for example, upon receiving an access request from a client. While the primary storage stores the data in a format specific to the distributed processing system, the backup storage stores the data in a different format, for example, format corresponding to the type of backup storage.

20 Claims, 9 Drawing Sheets

(56) References Cited

U.S. PATENT DOCUMENTS

| | | |
|---|---|---|
| 2012/0131275 A1 | 5/2012 | Huang et al. |
| 2012/0254215 A1 | 10/2012 | Miyata |
| 2013/0110778 A1 | 5/2013 | Taylor et al. |
| 2014/0188819 A1* | 7/2014 | Bagal ............... G06F 17/30144 707/692 |
| 2014/0195632 A1* | 7/2014 | Hunter ................... G06F 9/544 709/213 |
| 2014/0281247 A1* | 9/2014 | Loaiza ............... G06F 12/0875 711/126 |
| 2015/0106345 A1 | 4/2015 | Trimble et al. |
| 2015/0106420 A1 | 4/2015 | Warfield et al. |
| 2015/0106578 A1 | 4/2015 | Warfield et al. |
| 2015/0112951 A1 | 4/2015 | Narayanamurthy et al. |
| 2015/0113010 A1 | 4/2015 | Muthyala et al. |

OTHER PUBLICATIONS

International Search Report and Written Opinion in International Application No. PCT/US2014/062012 mailed Jan. 26, 2015, 11 pages.

Co-pending U.S. Appl. No. 14/137,706, filed Dec. 20, 2013, 37 pages.

Non-Final Office Action on co-pending U.S. Appl. No. 14/137,706 dated Jul. 15, 2016, 22 pages.

Final Office Action on co-pending U.S. Appl. No. 14/137,706 dated Apr. 20, 2016, 20 pages.

Non-Final Office Action on co-pending U.S. Appl. No. 14/137,706 dated Sep. 25, 2015, 20 pages

* cited by examiner

DATA MANAGEMENT IN DISTRIBUTED FILE SYSTEMS

TECHNICAL FIELD

Various of the disclosed embodiments relate to data management in distributed file systems.

BACKGROUND

Distributed data processing systems may be used to process and analyze large datasets. An example of such a framework is Hadoop, which provides data storage services to clients using a Hadoop Distributed File System (HDFS) and data processing services though a cluster of commodity computers or nodes. The HDFS executes on the cluster of computers (also referred to as compute nodes or processing nodes) to enable client access to the data in the form of logical constructs organized as blocks, e.g., HDFS blocks. The compute nodes operate mostly independently to achieve or provide results toward a common goal. Compute nodes of the cluster typically have their own private (e.g., shared-nothing) storage. As a result, the data stored in the storage of one compute node may not be accessed by another compute node.

This may be problematic because if a particular compute node fails, the data stored in the storage of that compute node becomes inaccessible. Accordingly, in some cases, multiple copies of the distributed data set (e.g., replicas) are created and a copy is stored in the storage of multiple (e.g., all) compute nodes of the cluster. However, additional instances of the distributed data set can result in data (or replica) sprawl. Data sprawl can become a problem because it increases the costs of ownership due, at least in part, to the increased storage costs. Further, data sprawl burdens the network resources that need to manage changes to the replicas across the distributed processing system.

In some other cases, to avoid the above described problem of increased costs of ownership, the storage of the compute nodes are configured to be shared between compute nodes, at least for read operations. That is, the compute nodes can read data from the storage of other compute nodes. This avoids the problem of replica sprawl. However, since a particular block of data is stored on a single storage, the storage can be a single point of failure of the distributed file system.

Thus, prior distributed file systems lack efficient data management techniques. There exists a need for efficient data management techniques that eliminates the problem of a storage being a single point of failure while minimizing the number of data replications.

DETAILED DESCRIPTION

Technology is disclosed for managing data in a distributed processing system ("the technology"). In various embodiments, the technology improves the availability of data and maintains a resource balance in a distributed processing system. The technology pushes "cold" data from a first storage system (also referred to as a "primary storage system" or "primary storage") of the distributed processing system to a second storage system (also referred to as a "backup storage system" or "backup storage") thereby maximizing availability of the primary storage to store "hot" data. "Cold" data can be data that has not been used (e.g., read or written) recently. Conversely, "hot" data can be data on which most data processing activities are presently or recently performed in the distributed processing system. The cold data can include data, e.g., data that is accessed least frequently, data that is accessed by the least number of clients, etc. In various embodiments, the cold data is identified based on a data eviction policy. Examples of data eviction policies can include known algorithms, e.g., least recently used (LRU), First-in-First-out (FIFO), least frequently used (LFU), Pseudo-LRU, Segmented LRU, etc. Administrators, e.g., database administrators, system administrators, etc., can select any of the above mentioned data eviction policies or create a customized data eviction policy. In some embodiments, data that is not cold data is referred to as the hot data. The cold data can be retrieved from the backup storage into the primary storage on demand, for example, upon receiving a request from a client system of the distributed processing system.

In some embodiments, the distributed processing system stores all data received from a client of the distributed processing system, including the cold data and hot data, at the backup storage. In various embodiments, the primary storage and the backup storage store the data in different formats. In some embodiments, the primary storage stores the data in a format specific to the distributed processing system, for example, as "chunks." A chunk of data is, for example, of a smaller size compared to the size of a block of data received from the client. The primary storage can be configured to store the data in the form of chunks. The backup storage can be a storage system, e.g., a native file server (NFS) or a storage service such as cloud storage (also known as "$/GB" storage) from a third party, and therefore can store the data in formats corresponding to the particular type of backup storage. The technology can convert data between the format of the distributed processing system and the format of the backup storage, e.g., when moving data between the storage systems.

By using the primary storage for storing hot data, and the backup storage for storing both the cold data and the hot data, the technology ensures that the space at the primary storage is managed efficiently and the problem of the primary storage being the single point of failure is eliminated.

Figure 1:
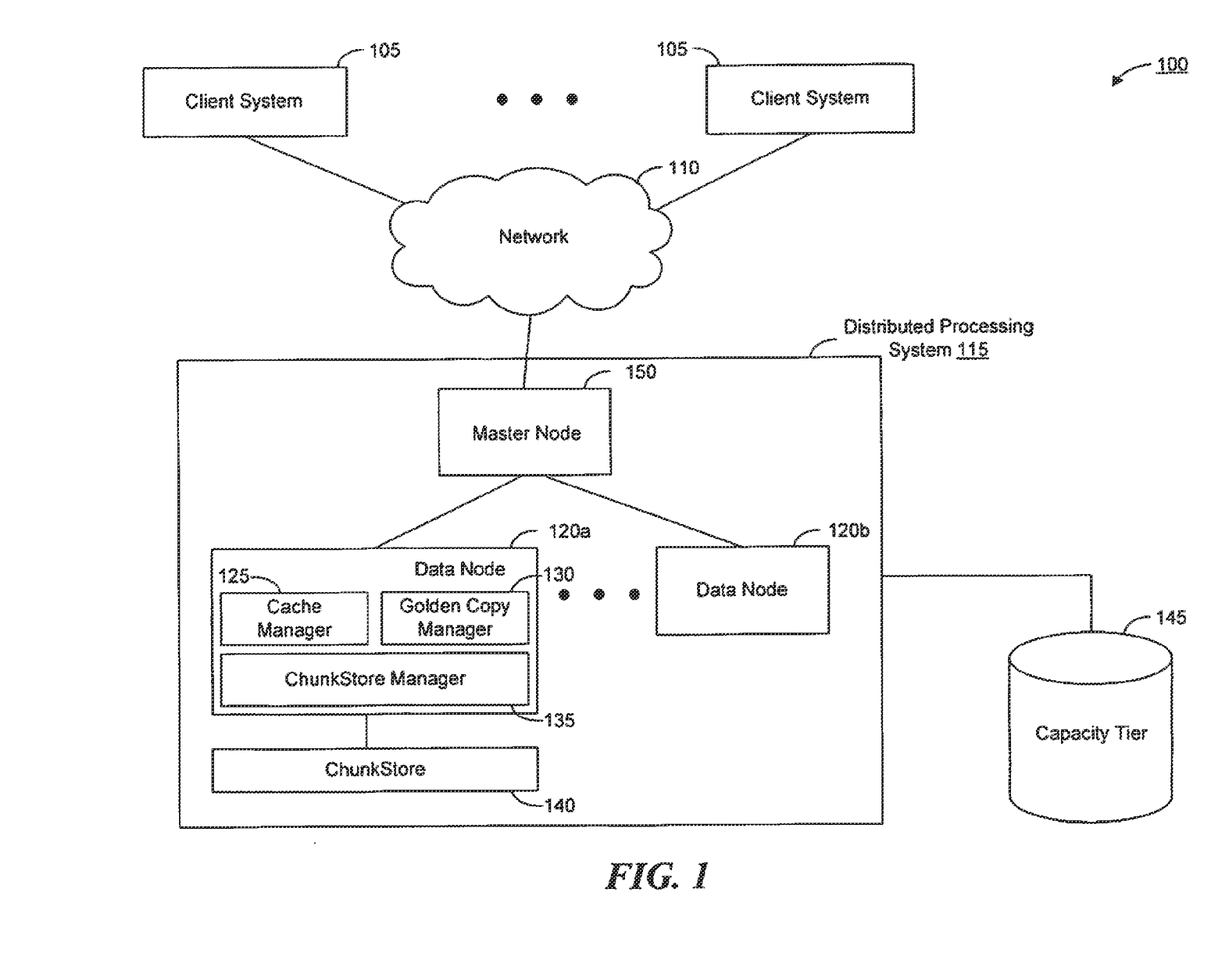
FIG. 1 is a block diagram illustrating a distributed processing environment in which the technology can operate in various embodiments.

Several embodiments of the described technology are described in more detail in reference to the figures. Turning now to figures, FIG. 1 is a block diagram illustrating a distributed processing environment 100 in which the technology can operate in various embodiments. The distributed processing environment 100 includes several client systems 105, a distributed processing system 115, and a network 110 connecting the client systems 105 and the distributed processing system 115. As illustrated in FIG. 1, the distributed processing system 115 includes a computing system 150, also referred to as master node 150, that facilitates read/write requests from the client systems 105. The master node 150 routes the read/write requests to one or more data nodes 120a-120b. The data node 120a is associated with a chunkstore 140 that acts as a primary storage of the distributed processing system 115 to store hot data. In the figure the various components associated with a data node are illustrated only for data node 120a. However, other data nodes, including data node 120b, can be similar to data node 120a. The distributed processing system 115 is associated with a capacity tier 145 that acts as a backup storage in the distributed processing environment 100 to store the entire set of data received from the client systems 105, including the hot data and the cold data.

The data nodes 120a-120b can ensure that the chunkstore 140 does not include cold data; and that the capacity tier 145 stores the entire set of data received from the client systems 105, including the hot data and the cold data.

In some embodiments, the distributed processing system 115 can be a Hadoop Distributed File System (HDFS). The client systems 105 can be HDFS clients and the blocks of data received from the client systems 105 can be HDFS data blocks. For simplicity of discussion, the distributed processing system 115 is considered to be HDFS, the client systems 105 to be HDFS clients and the blocks of data received from and transmitted to the client systems 105 to be HDFS data blocks. However, it should be noted that the disclosed technology is not necessarily restricted to HDFS.

In some embodiments, the master node 150 coordinates functions relating to the processing of jobs in the distributed processing environment 100. This coordination function may include servicing a read/write request from the client systems 105 by distributing the jobs for reading or writing the data to appropriate data nodes 120a-120b. In some embodiments, the master node 150 can include (or is), for example, a JobTracker of MapReduce engine used in association with HDFS. The JobTracker pushes work, e.g. read/write requests received from client systems 105, out to available data nodes 120a-120b in the distributed processing system 115.

In some embodiments, the master node 150 can include (or is), for example, a NameNode server of HDFS. The NameNode server is a server that manages the HDFS distributed file system, e.g., by tracking where in the distributed processing system 115 blocks corresponding to files are stored or can be stored. In FIG. 1, the master node 150 is illustrated as a standalone device. However, the master node 150 can be implemented as a separate computing device or in a device which performs other functions.

A cache manager 125 associated with the data node 120a facilitates storing the blocks of data received from the client systems 105 as chunks in the chunkstore 140. In the distributed processing system 115, data access requests from the client systems 105 are typically served by obtaining the data from the chunkstore 140. Accordingly, the distributed processing system 115 maximizes the usage of storage space in the chunkstore 140 for storing data that is more likely to be requested by the client systems 105. The cache manager 125 monitors the chunkstore 140 to ensure that it does not store cold data. Particularly, the cache manager 125 identifies the cold data in the chunkstore 140, verifies if the cold data is stored at the capacity tier 145, and deletes the cold data from the chunkstore 140. In some embodiments, the cache manager 125 identifies the cold data based on a data eviction policy.

The data node 120a includes a golden copy manager 130 that stores a copy of the entire data ("golden copy") related to the client systems 105, including hot data and cold data, at the capacity tier 145. The golden copy manager 130 "pushes" the cold data from the chunkstore 140 to capacity tier 145, e.g., by copying the data via a network or other data communications connection. In various embodiments, the golden copy manager 130 and the cache manager 125 work in coordination with each other to ensure that the capacity tier 145 has a copy of the cold data before deleting the cold data from the chunkstore 140.

The chunkstore 140 can store the data in a format different from that of the data stored at the capacity tier 145. In some embodiments, the chunkstore 140 stores the data in a format specific to the distributed processing system 115, for example, as "chunks." A chunk of data is, for example, of smaller size compared to the size of a block of data received from a client system. In embodiments where the distributed processing system 115 is HDFS, the data received from the client systems 105 can be in the form of HDFS data blocks. An HDFS data block can typically be in the order of Gigabytes (GB). However, a chunk, in some embodiments, is typically in the order of Megabytes (MB), for example, four (4) MB. In some embodiments, a chunk is a unit of storage within the chunkstore 140. A chunk manager 135 in the data node 120a converts a block of data into chunks of data and stores the chunks in the chunkstore 140. The layout of the chunkstore 140 is described in greater detail below with reference to FIG. 8. The chunk manager 135 and the chunkstore 140 work in coordination with each other to write a block of data received from the client system 105 as chunks in the chunkstore; and reconstruct a block of data from the chunks of data upon receiving requests from the client systems 105. However, the client systems 105 are agnostic of the conversion between HDFS blocks and the chunks. The client systems 105 provide data to and receive data from the distributed processing system 115 as HDFS blocks.

The capacity tier 145 can be a remote storage system that can be connected to the distributed processing system 115 over NFS, Hypertext Transfer Protocol (HTTP), or another proprietary access protocol. The capacity tier 145 can be a storage system of various types, e.g., NFS, Network attached storage (NAS), Redundant Array of Independent Nodes (RAIN), a "$/GB" storage, or any other storage type, e.g., offered by a third party. In some embodiments, the capacity tier 145 may not be part of the distributed processing system 115. Therefore, the capacity tier 145 can store the data in various formats, including formats corresponding to the type of the above mentioned storage system. In some embodiments, the golden copy manager 130 and the capacity tier 145 work in coordination with each other to convert the block of data received from the client system 105 to a format corresponding to the type of storage of the capacity tier 145 before storing the data in the capacity tier 145.

The chunkstore 140 can employ various storage devices, e.g., disks, flash memory, solid-state drives (SSDs), tape storage, E-series storage system products available from NetApp®, Inc., third party storage systems, etc. Further, the chunkstore 140 can be implemented in a RAID configuration to improve reliability, availability, performance and/or capacity. The capacity tier 145 can also employ various storage devices, e.g., disks, flash memory, solid-state drives (SSDs), tape storage, etc. In some embodiments, one or more of the data node 120a, chunkstore 140 and capacity tier 145 can be provided by the same vendor or different vendors.

Figure 2:
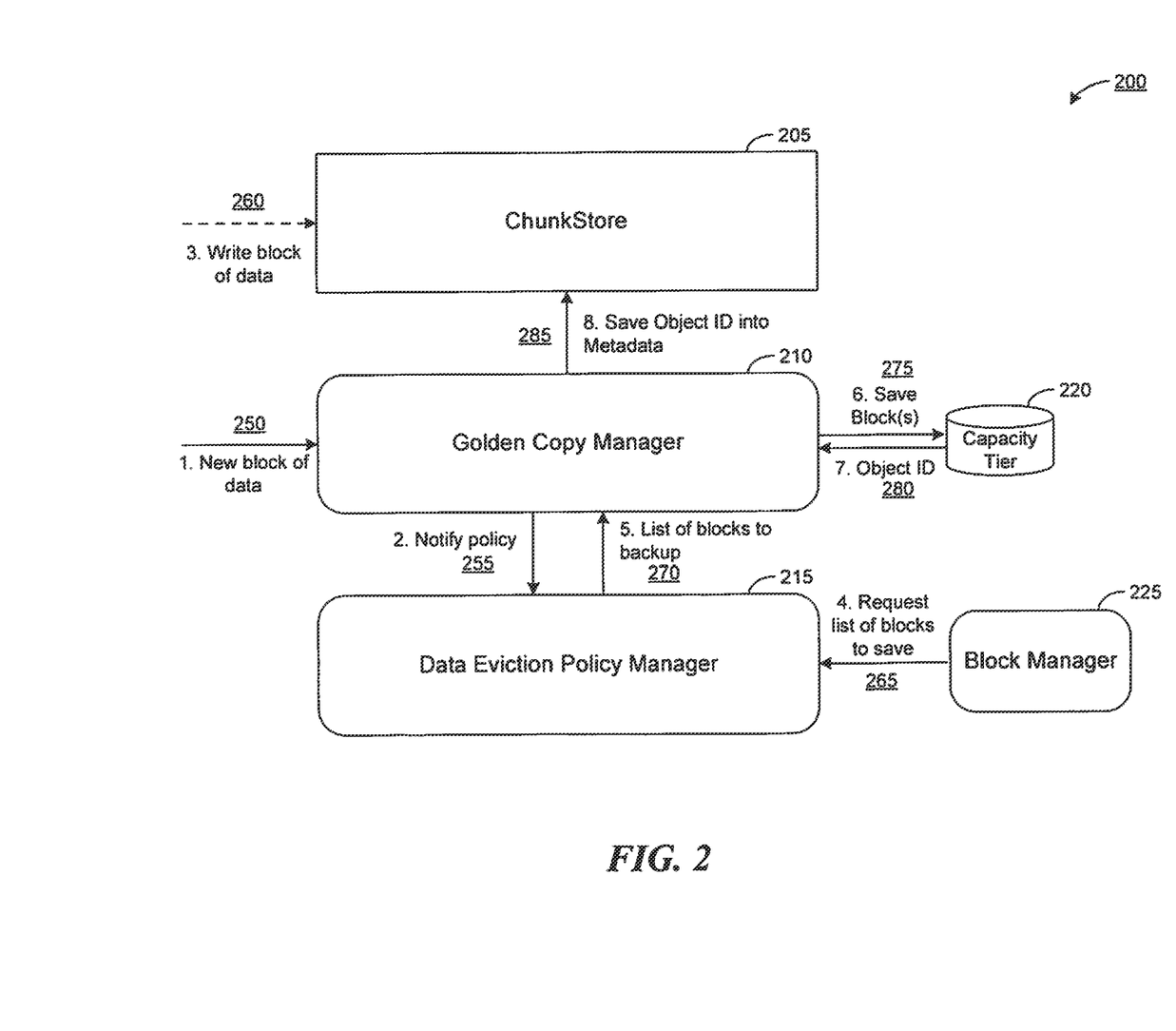
FIG. 2 is a block diagram illustrating a distributed processing environment for writing a block of data into a distributed processing system, consistent with various embodiments.

FIG. 2 is a block diagram illustrating a distributed processing environment 200 for writing a block of data into a distributed processing system, consistent with various embodiments. In some embodiments, the golden copy manager 210 can be similar to the golden copy manager 130 of FIG. 1, the capacity tier 220 can be similar to the capacity tier 145, and the chunkstore 205 can be similar to the chunkstore 140. A client system intends to write a new block of data into the distributed processing system, e.g. distributed processing system 115 of FIG. 1. The data node 120a writes the new block of data to the distributed processing system by writing it into the chunkstore 205 and the capacity tier 220 as follows.

The golden copy manager 210 receives 250 a new block of data. The golden copy manager 210 (and/or cache manager, e.g., cache manager 125) notifies 255 the data eviction policy manager 215 that a write access request is received for a new block of data at the distributed processing system 100. In some embodiments, the notifications of read/write access of a block of data enable the data eviction policy manager 215 to track the access pattern of the block of data, which may be used in the determination of whether the block of data is cold data. The data eviction policy manager 215 manages eviction of cold data, e.g., by enforcing a policy.

In some embodiments, the new block of data is written 260 into the chunkstore 205 by the cache manager 125. Further, the cache manager 125 writes the new block of data into the chunkstore 205 independent of the actions performed by the golden copy manager 210, e.g., in parallel to, after, or before the actions performed by the golden copy manager 210.

In some embodiments, the new block of data is written or saved 275 into the capacity tier 220 by the golden copy manager 210. Further, the golden copy manager 210 writes a block of data into the capacity tier 220 as and when the new block of data is received at the distributed processing system. However, in some embodiments, due to various reasons, e.g., capacity tier 220 having failed momentarily or being overloaded, or golden copy manager 210 being backlogged, the new block of data may not be written to the capacity tier 220 instantaneously.

Accordingly, a block manager 225 requests 265 the data eviction policy manager 205 to provide the golden copy manager 210 with a list of blocks of data that have to be stored on the capacity tier 220. In some embodiments, the determination of when the blocks of data have to be backed up to the capacity tier 220 and/or deleted from the chunkstore 205 is done in response to a trigger condition. Examples of trigger condition include a specific time interval, receipt of new block of data at the distributed processing system, the amount of storage used at the chunkstore 205 exceeding a specific threshold, etc. When the trigger condition is satisfied, the block manager 225 requests 270 the data eviction policy manager 215 to provide the list of blocks to be stored at the capacity tier 220.

After receiving 265 the list of blocks, the golden copy manager 210 obtains the blocks of data from the chunkstore 205 and stores 275 them at the capacity tier 220. The capacity tier 220 generates object identifications (IDs) identifying the corresponding blocks of data and returns 280 the object IDs to the golden copy manager 210. The golden copy manager 210 further stores 285 the object IDs at the chunkstore 205. In some embodiments, the object IDs can also be interpreted, used, understood, or decoded by the capacity tier 220. In various embodiments, the object IDs can be part of metadata of the blocks of data in the distributed processing system. In some embodiments, the metadata enables the distributed processing system to locate and read the requested blocks of data, as described in further detail below with reference to FIG. 4.

In various embodiments, when the golden copy manager 210 stores the blocks of data at the capacity tier 220, the golden copy manager 210 works in co-ordination with the capacity tier 220 to convert the blocks of data to a format supported by the capacity tier 220.

Figure 3:
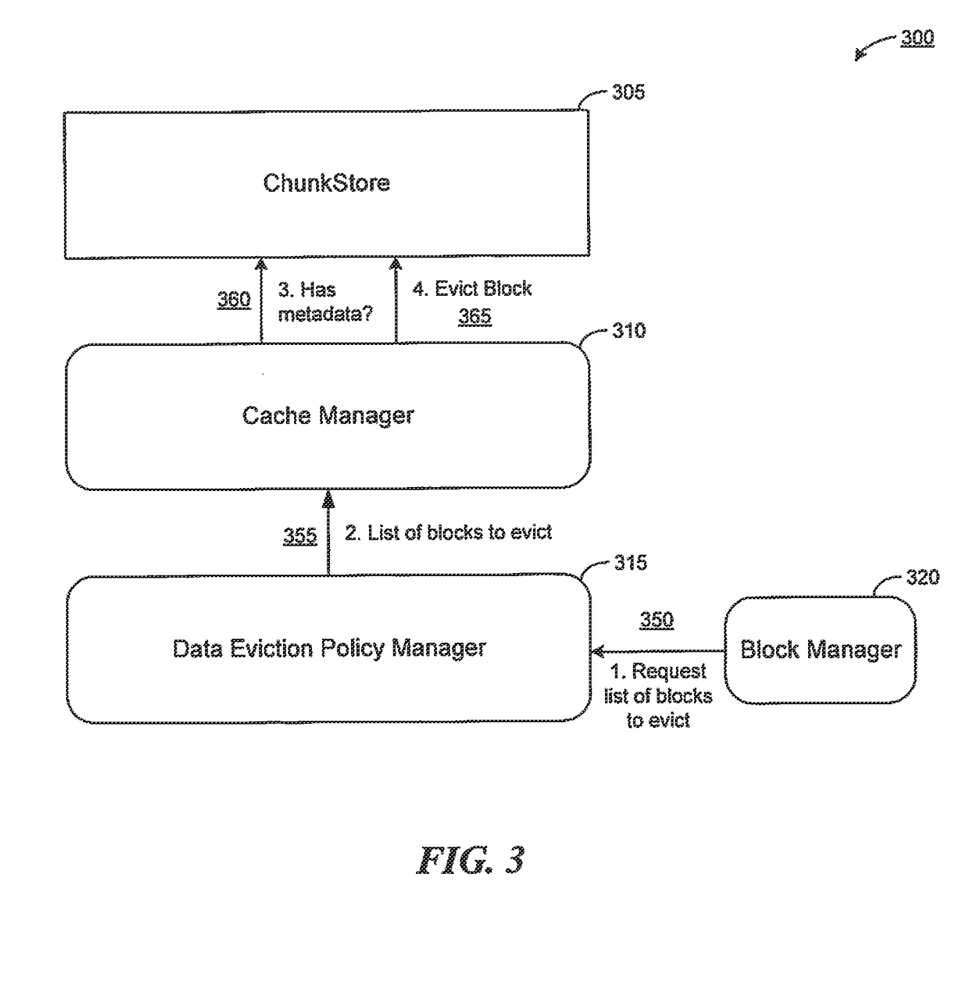
FIG. 3 is a block diagram illustrating a distributed processing environment for evicting cold data from a distributed processing system, consistent with various embodiments.

FIG. 3 is a block diagram illustrating a distributed processing environment 300 for evicting cold data from a distributed processing system, consistent with various embodiments. In some embodiments, cache manager 310 can be similar to the cache manager 125 of FIG. 1, the chunkstore 305 can be similar to the chunkstore 205 of FIG. 2, the data eviction policy manager 315 can be similar to the data eviction policy manager 215, and block manager 320 can be similar to the block manager 225.

As described above, the determination of when blocks of data are backed up to a capacity tier and/or deleted from the chunkstore can be done in response to a trigger condition. When the trigger condition is satisfied, the block manager 320 requests 350 the data eviction policy manager 315 to provide the list of blocks to be deleted from the chunkstore 305. The data eviction policy manager 315 identifies the blocks of data (cold data) to be deleted and provides 355 the list to the cache manager 310. In some embodiments, the data eviction policy manager 315 identifies the cold data at least using the access patterns of the blocks of data tracked using the notifications discussed with reference to FIG. 2.

After receiving the list of cold data to be deleted, the cache manager 305, determines 360 whether the chunkstore 305 has the metadata, including the object IDs, of the cold data. If the chunkstore 305 has the metadata, the cache manager 305 deletes the cold data. On the other hand, if the chunkstore 305 does not have the metadata, the cache manager 305 works in co-ordination with the golden copy manager, e.g., golden copy manager 210 to backup (e.g., evict 365) the cold data to the capacity tier, e.g., capacity tier 220, as described at least with reference to FIG. 2.

Figure 4:
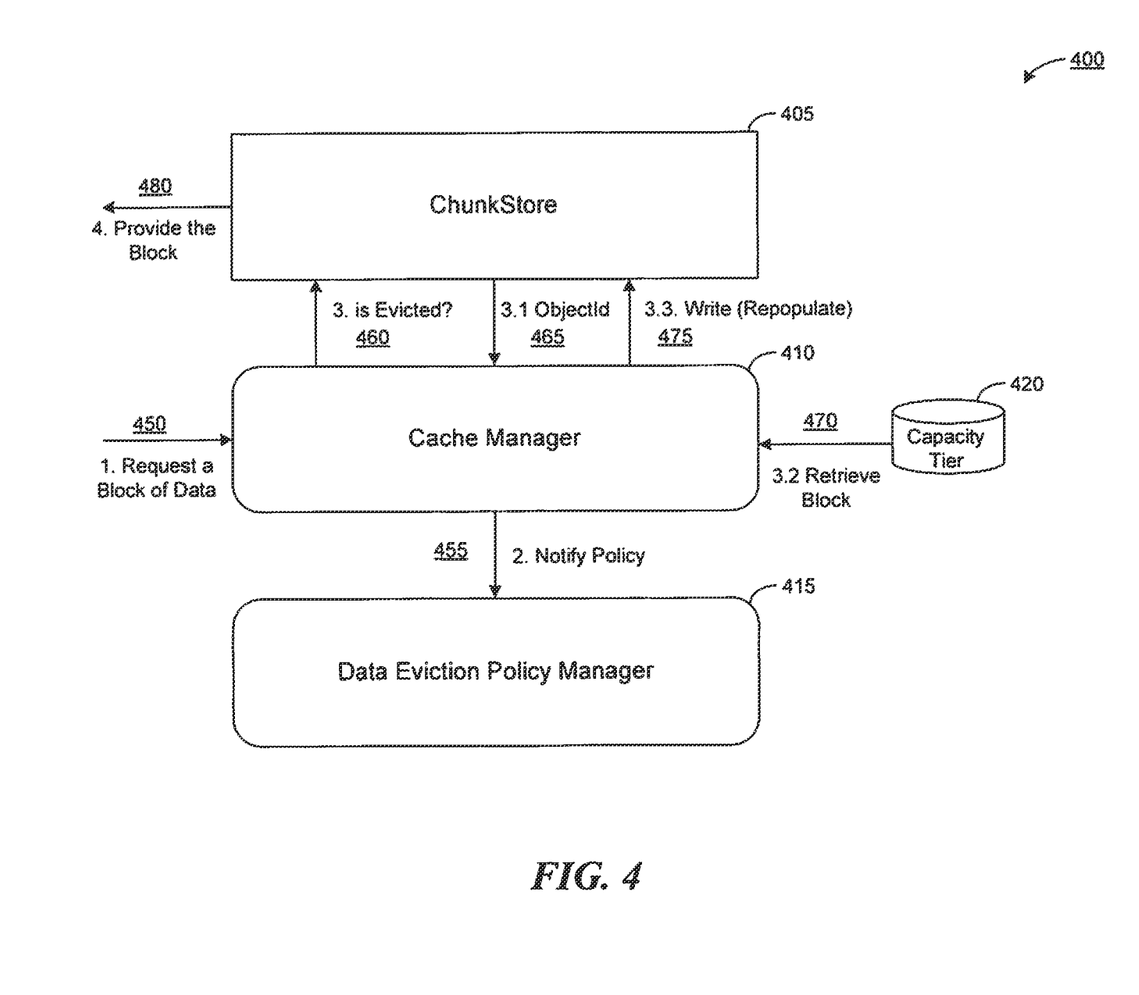
FIG. 4 is a block diagram illustrating a distributed processing environment for reading a block of data from a distributed processing system, consistent with various embodiments.

FIG. 4 is a block diagram illustrating a distributed processing environment 400 for reading a block of data from a distributed processing system, consistent with various embodiments. In some embodiments, cache manager 410 can be similar to the cache manager 310 of FIG. 3, the capacity tier 420 can be similar to the capacity tier 220 of FIG. 2, the chunkstore 405 can be similar to the chunkstore 205, and the data eviction policy manager 415 can be similar to the data eviction policy manager 215. A client system intends to read a block of data into the distributed processing system.

The cache manager 410 receives 450 the read request and notifies 455 the data eviction policy manager 415 of the read request for the block of data. As described in connection to FIG. 2, the notifications of read/write access of a block of data enable the data eviction policy manager 415 to track the access pattern of the block of data, which may be used in the determination of whether the block of data is cold data.

In various embodiments, the cache manager 410 can respond to read requests from client systems by obtaining the requested blocks of data from the chunkstore 405. Accordingly, the cache manager 410 determines 460 whether the block of data has been evicted from the chunkstore 405. If the block of data is available at the chunkstore 405, the cache manager 405 provides the block of data to the client system. However, if the block of data is evicted from the chunkstore 405, the cache manager 410 retrieves the block of data from the capacity tier 420. The cache manager 410 retrieves the block of data from the capacity tier 405 by (a) obtaining 465 the metadata of the block of data, including the object ID, from the chunkstore 405 and (b) retrieving 470 the block of data from the capacity tier 420 using the object ID. The cache manager 410 writes 475 the retrieved block of data to the chunkstore 405, and provides 480 the block of data to the client system.

Figure 5:
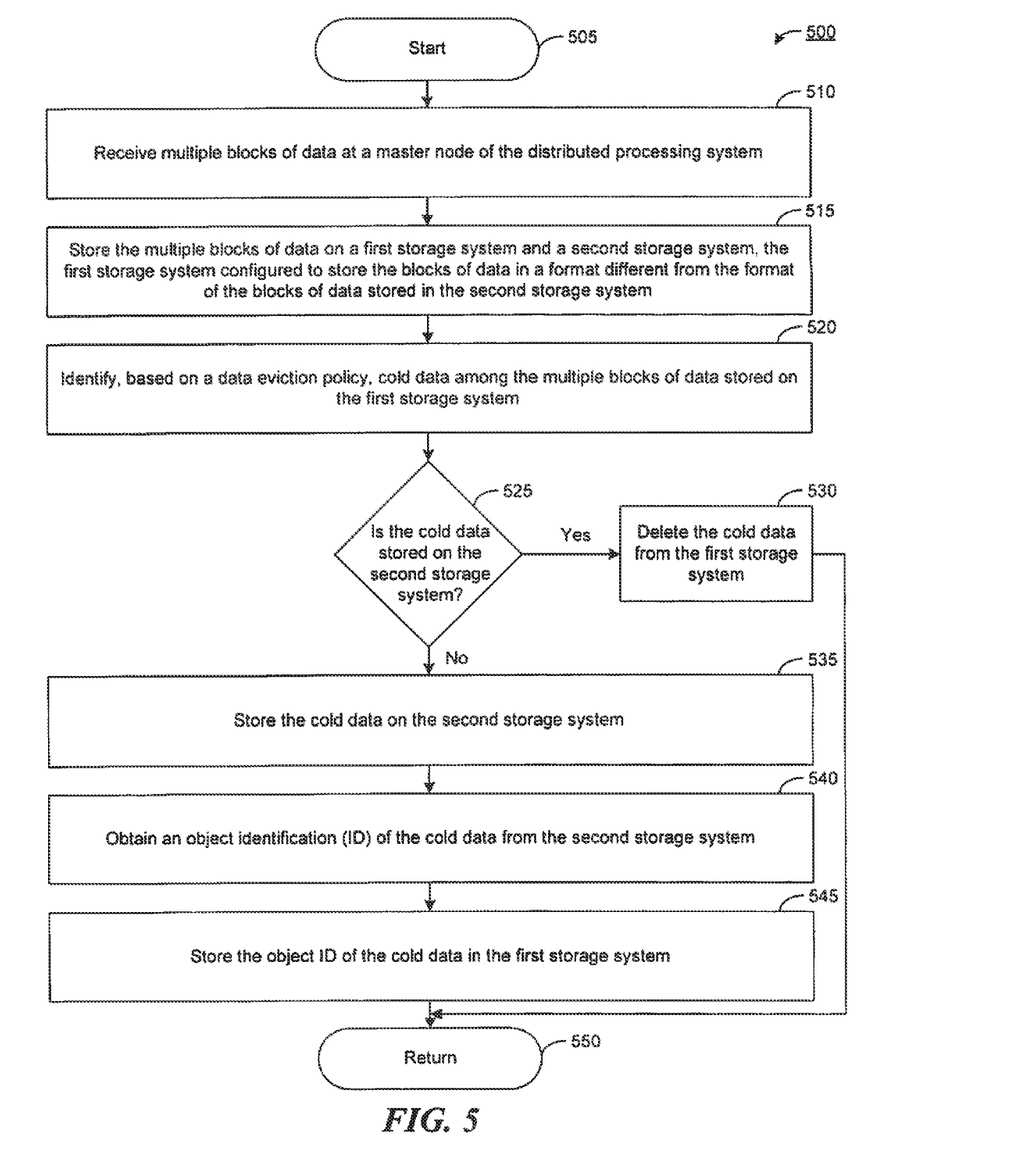
FIG. 5 is a flow diagram illustrating a process for managing cold data in a distributed processing system, consistent with various embodiments.

FIG. 5 is a flow diagram illustrating a method 500 for managing cold data in a distributed processing system, consistent with various embodiments. In various embodiments, the method 500 may be executed in a distributed processing environment, e.g., distributed processing environment 100 of FIG. 1. The method 500 starts at block 505. At block 510, a data node 120a of the distributed processing system receives multiple blocks of data. At block 515, the data node 120a stores the blocks of data at a first data storage system, e.g. chunkstore, and at a second data storage system, e.g. a capacity tier. The chunkstore may store the blocks of data in a format different from the format blocks of data stored at the capacity tier. In some embodiments, the chunkstore stores the blocks of data in a format specific to the distributed processing system 100, e.g., as chunks, wherein a chunk of data is of a smaller size compared to that of a block of data received from the client, and one single block of data can be stored as multiple chunks of data.

At block 520, the data node 120a identifies one or more blocks of data among the blocks of data stored at the chunkstore as cold data. The data node 120a identifies the cold data based on a data eviction policy.

At decision block 525, the data node 120a determines whether the cold data is stored at (or backed up to) the capacity tier. If the cold data is stored at the capacity tier, at block 530, the data node 120a deletes (evicts) the cold data from the chunkstore and then returns at stock 550. On the other hand, if the cold data is not stored at the capacity tier, at block 535, the data node 120a stores the cold data at the capacity tier and then may evict the cold data.

At block 540, the data node 120a obtains object IDs of the blocks of data written to the capacity tier. In some embodiments, the data node 120a can also obtain other metadata of the blocks of data. At block 545, the data node 120a stores the obtained object IDs (and any other obtained metadata) at the chunkstore. The method returns at block 550.

Those skilled in the art will appreciate that the logic illustrated in FIG. 5 and described above, and in each of the flow diagrams discussed below, may be altered in various ways. For example, the order of the logic may be rearranged, substeps may be performed in parallel, illustrated logic may be omitted, other logic may be included, etc.

Figure 6:
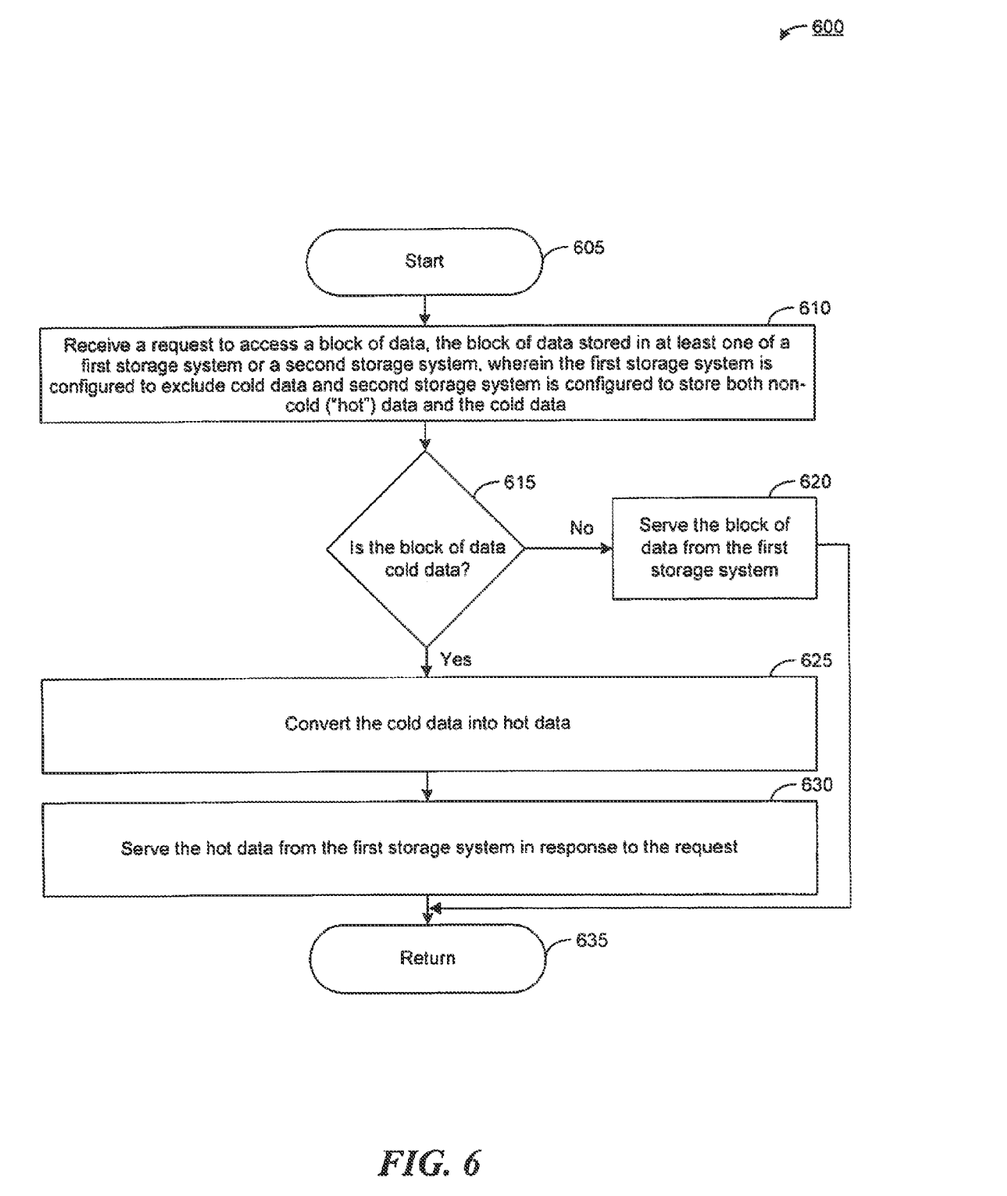
FIG. 6 is a flow diagram illustrating a method for reading a block of data from a distributed processing system, consistent with various embodiments.

FIG. 6 is a flow diagram illustrating a method 600 for reading a block of data from a distributed processing system, consistent with various embodiments. The method 600 may be executed in a distributed processing environment, e.g., distributed processing environment 100 of FIG. 1. The method 600 starts at block 605. At block 610, a data node 120a of the distributed processing system receives a request for accessing a block of data stored at the distributed processing system. The block of data can be stored at at least one of first storage system, e.g. chunkstore, or a second storage system, e.g. a capacity tier. In various embodiments, the chunkstore is configured to store hot data and the capacity tier is configured to store the entire set of data received form the client systems, including hot data and cold data.

At decision block 615, the data node 120a determines whether the requested block of data is cold data. In some embodiments, the data node 120a determines whether the block of data is cold data by determining whether the block of data is available at the chunkstore. If the block of data is available at the chunkstore, then the block of data is identified as hot data, otherwise it is identified as cold data. If the data node 120a determines that the requested block of data is not cold data, then at block 620 the master node obtains the block of data from the chunkstore and serves it in response to the request. The process then returns at block 635. On the other hand, if the data node 120a determines that the block of data is cold data, then at block 625 the data node 120a converts the cold data to hot data. At block 630, the data node 120a obtains the hot data from the chunkstore and serves the hot data in response to the request. The method returns at block 635. The conversion of cold data to hot data is described with reference to FIG. 7 below.

Figure 7:
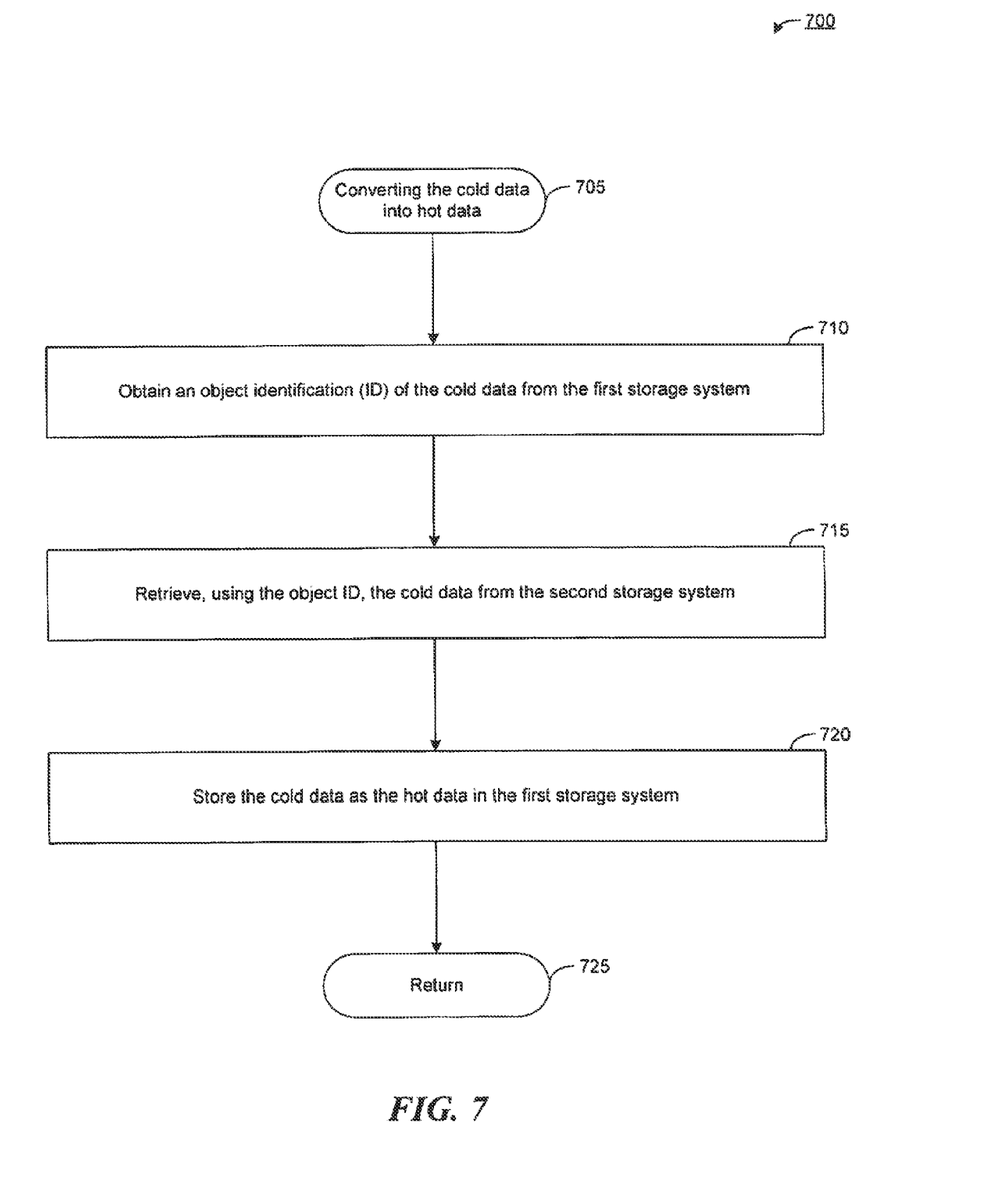
FIG. 7 is a flow diagram illustrating a method for converting cold data to hot data in a distributed processing system, consistent with various embodiments.

FIG. 7 is a flow diagram illustrating a method 700 for converting cold data to hot data in a distributed processing system, consistent with various embodiments. The method 700 may be executed in a distributed processing environment, e.g., distributed processing environment 100 of FIG. 1, and in some embodiments, as part of method 600. The method 700 begins at block 705. After a block of data is identified as cold data, at block 710, the data node 120a obtains an object ID of the block of data from the chunkstore.

At block 715, the data node 120a retrieves the block of data from the capacity tier using the object ID. At block 720, the data node 120a writes the retrieved block of data into the chunkstore. The block of data now becomes hot data since it is available in the chunkstore. The method returns at block 725.

Figure 8:
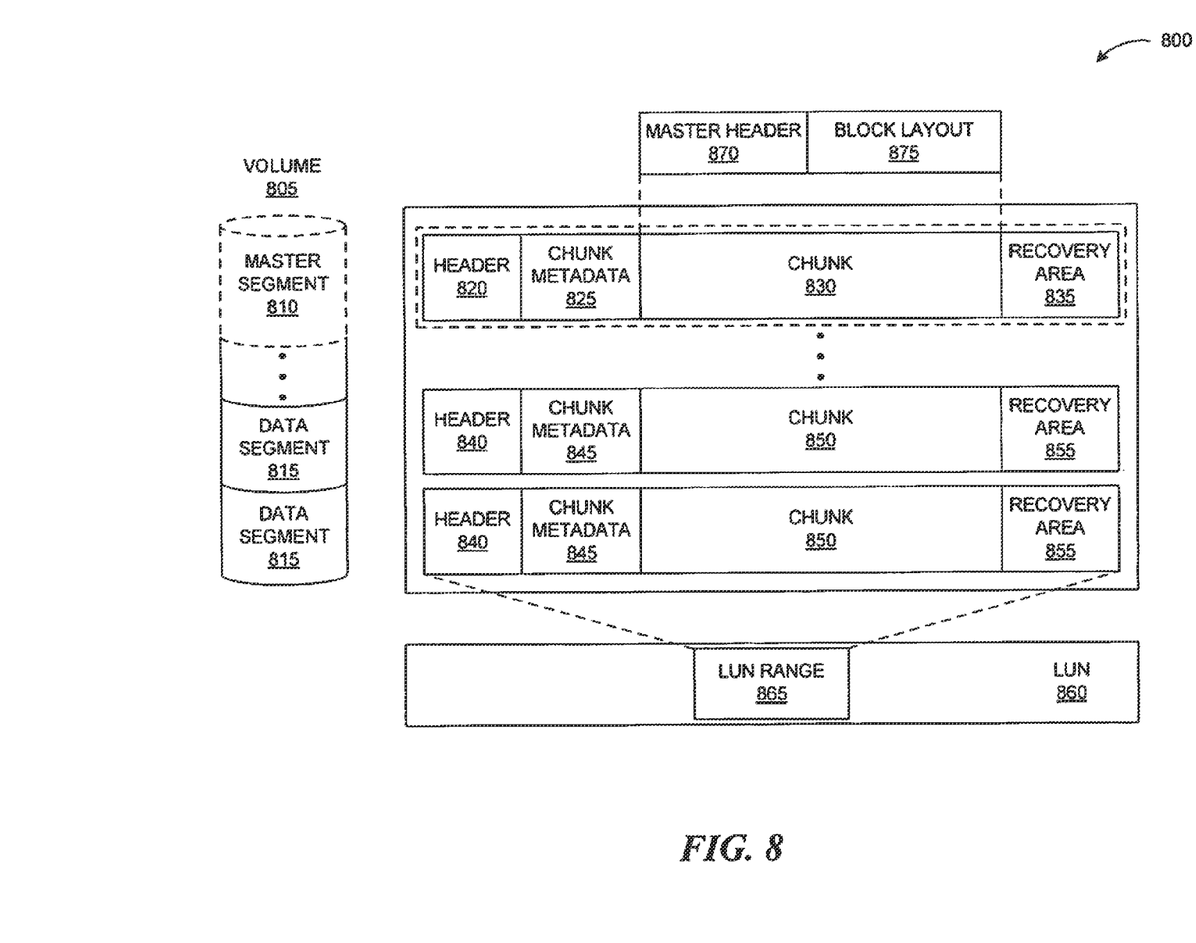
FIG. 8 is a block diagram of an on-disk layout of a chunkstore of a distributed processing system, consistent with various embodiments.

FIG. 8 is a block diagram of an on-disk layout 800 of a chunkstore 140 of a distributed processing system 115 of FIG. 1, consistent with various embodiments. As described with reference to FIG. 1, in some embodiments, the chunkstore 140 can include various storage devices, e.g., disks, flash memory, solid-state drives (SSDs), tape storage, E-series storage system products available from NetApp®, Inc., etc. For simplicity of discussion, it is considered that the chunkstore 140 includes disks, but in reality, the chunkstore may employ other types of storage devices.

In some embodiments, the on-disk layout 800 of the chunkstore 140 is implemented as multiple volumes 805. A volume comprises a subset of disks of the chunkstore 140, and acts as an individual data container, e.g., chunkstore 140. The volume 805 may include a plurality of segments, wherein one segment is a master segment 810 and the other segments are data segments 815. Each segment may be formed from a range of bytes within a logical unit number (LUN) 860 constructed from one or more disks of the storage devices of chunkstore. In some embodiments, a LUN is a logical representation of storage. The LUN appears as a hard disk to a client. In some embodiments, a LUN appears as a file inside of a volume. A LUN range 865 thus defines a location of a segment within the volume 805. In some embodiments, the LUN range 865 may be a contiguous range of bytes within a LUN 860, although it will be understood to those skilled in the art that the range of bytes need not be contiguous. That is, instead of a physical range of disk space (e.g., disk blocks) constituting LUN 860, a virtual range of disk space could constitute the LUN, wherein the disk blocks of the virtual range of disk space may be written anywhere on disk (e.g., by a write-anywhere file system) and organized as LUN range 865 by, e.g., linking of the blocks throughout the storage array.

Accordingly, the volume 805 may contain multiple LUN ranges 865 for data and master segments of the volume. A segment does not have to be contained within the same LUN 860 to form the volume 805. That is, different segments (e.g., different LUN ranges 865) of different LUNs 860 may be organized as the volume 805. As an example, the volume may constitute four segments formed from two LUNs 860, wherein three of the segments may be formed from a first LUN and one of the segments may be formed from a second LUN. As a result, a size or capacity of the volume may be grown or shrunk quickly and efficiently. For instance, to grow the capacity of the volume, a system administrator need only add more data segments 815 to the volume. The various segments of the various LUNs 860 may then be organized as the volume 805 using identifiers, as discussed further herein.

In some embodiments, each data segment 815 has an on-disk layout organized as several fields, including a header field 840, a chunk metadata field 845, a chunk field 850 and a recovery area field 855. As described above, a chunk is a unit of storage within the on-disk layout of the chunkstore 140. The data segments 815 of volume 805 are provided to allocate, store, retrieve and recover chunks, including their data and metadata. To that end, the header field 840 generally contains information about the data segment, including a size of the segment, a size of the chunk(s) stored within the segment, a storage location of different components/areas of the segment (e.g., the LUN within which the segment is stored) and the volume to which the segment belongs.

Each data segment is associated with other data segments to form the volume using various identifiers contained in the header field 840. One such identifier is a LUN identifier (LUN ID) that provides the association of the data segment to a LUN. The LUN ID includes an offset within the LUN and a size of the segment constituting the LUN range. Illustratively, the LUN ID is located in the header field 840 of data segment 815 because that LUN ID may be different for each segment. Another identifier is a volume identifier (volume id) that, among other things, operates to associate the data segments collectively as volume 805.

The chunks are stored in the chunk field 850 of the data segment 815. As used herein, allocation of a chunk denotes adding a chunk to the chunk field 850 and de-allocation of a chunk denotes deleting or removing a chunk from the chunk field 850. Once written and allocated, a chunk may not be modified (e.g., written again); it can only be deleted/deallocated. Therefore, a simple chaining of chunks may be all that is needed. To modify its data content, the chunk is deallocated (deleted) and then allocated (written); that is, the chunk is not modified in place. Metadata is provided for managing and tracking the allocation/deallocation of chunks within the chunk field 850 of the data segment 815. The chunk metadata information (e.g., allocation/deallocation information) is stored in the chunk metadata field 845. In some embodiments, chunk metadata is stored in the chunk metadata field 845 for each corresponding chunk stored in the chunk field 850. Each chunk metadata may specify whether the corresponding chunk has been allocated (or deallocated) and, if allocated, to which client or application it has been allocated. Thus, the client that allocated or deallocated the corresponding chunk may be identified by the chunk metadata.

The recovery area field 855 contains recovery information that identifies any change made to the chunk metadata. In some embodiments, the recovery information includes a transaction identifier that uniquely identifies the recovery information, an action (e.g. an allocation or deallocation operation) and a checksum for use in error correction during replay/recovery of checksum-related data. The allocation or deallocation operation, including a change of state, of a chunk in the data segment 815 is written to the recovery area field 855. A change of state of the chunk denotes a change or transition to the chunk metadata of the chunk; the allocation/deallocation of a chunk transitions through certain states, for example, partially allocated, partially filled, not yet finalized, allocated, and deallocated.

In some embodiments, a data segment 815 is not dependent upon (and thus is unaware of the presence of) another data segment within a volume; the data segments of the volume are totally isolated. Accordingly, the data segment 815 may be defined as a fault boundary, which means that if a failure occurs to the segment, the failure is totally contained within the segment. Such a fault boundary eliminates a single recovery area (and single point of failure) for an entire volume. Only the master segment 810 is aware of the presence other data segments 815 in the volume 805.

In some embodiments, the master segment 810 contains information sufficient to organize all of the data segments within the volume. The organization of the volume 805 ensures that each data segment 815 is independent of other data segments and, if a failure occurs on a storage device or LUN range 865 that constitutes the particular data segment, the failure is isolated within that data segment 815. Although this organization advantageously obviates the destruction of the volume in response to a failure of a data segment, the content of the failed data segment can still be recovered using error detection and correction techniques (e.g. RAID) on the storage devices in the chunkstore 140.

In some embodiments, the master segment 810 has an on-disk layout that is generally similar to that of the data segment 815. That is, the master segment 810 is organized as several fields, including a header field 820, a chunk metadata field 825, a chunk field 830 and a recovery area field 835. The header field 820 generally contains metadata information about the master segment, including a size of the segment, a storage location of the segment (e.g., the LUN ID within which the segment is stored) and the volume (ID) to which the segment belongs. The chunk metadata field 825 identifies changes (e.g., allocation or deallocation) to the master segment 810 and the recovery area field 835 logs those changes. However, the chunk field 830 of the master segment 810 is formatted to include a master header sub-field 870 and a block layout sub-field 875 pertaining to the layout of a block (e.g. a HDFS data block).

In some embodiments, a block is a logical construct that resides in volume 805 and includes a collection of chunks. The size of a block can vary, e.g., the block can include one chunk or a substantially large number of chunks. A chunk may be allocated to a block; otherwise, the chunk is freed (e.g., deallocated). The allocation/deallocation information of a chunk is tracked and managed at the data segment level and, thus, is not maintained in the master segment 810.

The chunks stored on a data segment 815 may be chained (linked) together to form blocks of the volume 805; illustratively, the master segment 810 contains block layout information for the blocks contained in its volume. In some embodiments, the chunks stored in the data segment 815 may be organized as blocks and information (metadata) related to the data/chunks of blocks contained within the data segment may be represented as a block layout. Note that the block layout contains a description of the blocks that are stored in a particular data segment 815 of the volume 805, i.e., each data segment 815 has its own block layout. Note further that a block may generally span one data segment (a block generally does not contain chunks from different segments). Thus, the block layout information may be provided per data segment.

In some embodiments, the master header sub-field 870 contains information such as the number of data segments 815 in the volume 805, the number of block layouts for the data segments 815 and the offset at which each block layout starts. The block layout sub-field 875 contains block layout information, including client-specific metadata, for all blocks that are stored within a corresponding data segment 815. Assume a client requests writing of a block; the block layout information may include an identification of the block (block id), the size of the block, client (user) permissions and checksum of the data of the block. In an embodiment, the block layout sub-field 875 may include information (e.g., metadata) that specifies the linking of chunks of a block via pointers to the chunks of the block, as well as a 64-bit block id that uniquely identifies/names the block. The sub-field 875 may also contain information as to whether the block is allocated or deallocated and information about the block layout on the segment.

In some embodiments, alignment of the various fields of the master and data segments of a volume may provide substantial improvement to read/write performance of the chunkstore. The fields (e.g., header, chunk metadata, chunk, and recovery area) of the master and data segments are discrete disk locations (e.g., sectors) within the LUNs 860 of the disks. Starting offsets of these fields may be aligned to, e.g., a stripe width across the disks of a RAID group, to ensure that only required information is read/written when accessing a stripe. For example, if the stripe width is a multiple of the disk sector size (e.g., 512 KB), the starting offsets may be multiples of 512 KB. In particular, the starting offsets of one or more fields of the segments may be aligned with the striped width so that all of the required information from the field(s) may be accessed with, e.g., one read access.

Figure 9:
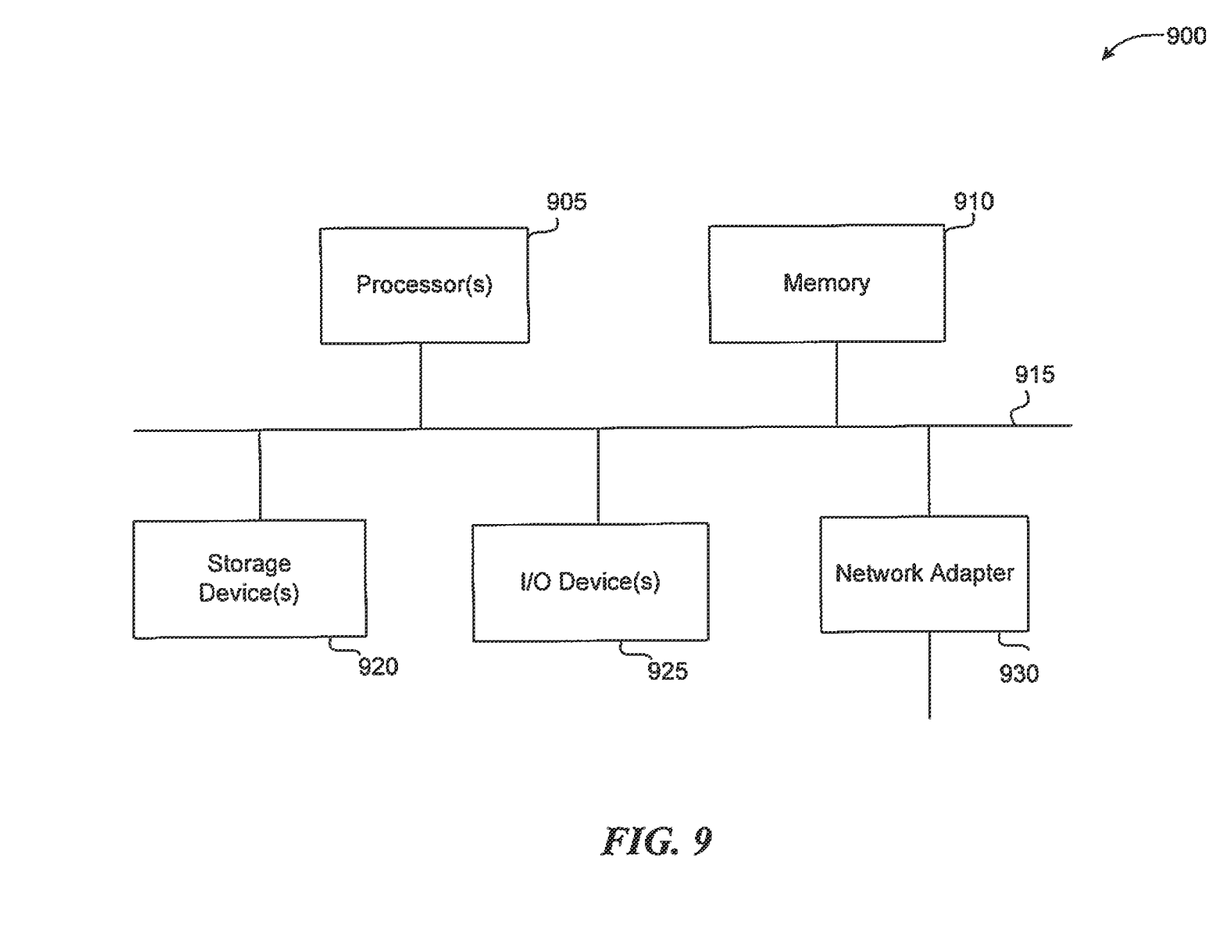
FIG. 9 is a block diagram of a computer system as may be used to implement features of some embodiments of the disclosed technology.

FIG. 9 is a block diagram of a computer system as may be used to implement features of some embodiments of the disclosed technology. The computing system 900 may include one or more central processing units ("processors") 905, memory 910, input/output devices 925 (e.g., keyboard and pointing devices, display devices), storage devices 920 (e.g., disk drives), and network adapters 930 (e.g., network interfaces) that are connected to an interconnect 915. The interconnect 915 is illustrated as an abstraction that represents any one or more separate physical buses, point to point connections, or both connected by appropriate bridges, adapters, or controllers. The interconnect 915, therefore, may include, for example, a system bus, a Peripheral Component Interconnect (PCI) bus or PCI-Express bus, a Hyper-Transport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The memory 910 and storage devices 920 are computer-readable storage media that may store instructions that implement at least portions of the described technology. In addition, the data structures and message structures may be stored or transmitted via a data transmission medium, such as a signal on a communications link. Various communications links may be used, such as the Internet, a local area network, a wide area network, or a point-to-point dial-up connection. Thus, computer-readable media can include computer-readable storage media (e.g., "non-transitory" media) and computer-readable transmission media.

The instructions stored in memory 910 can be implemented as software and/or firmware to program the processor(s) 905 to carry out actions described above. In some embodiments, such software or firmware may be initially provided to the processing system 900 by downloading it from a remote system through the computing system 900 (e.g., via network adapter 930).

The technology introduced herein can be implemented by, for example, programmable circuitry (e.g., one or more microprocessors) programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

Remarks

The above description and drawings are illustrative and are not to be construed as limiting. Numerous specific details are described to provide a thorough understanding of the disclosure. However, in certain instances, well-known details are not described in order to avoid obscuring the description. Further, various modifications may be made without deviating from the scope of the technology. Accordingly, the technology is not limited except as by the appended claims.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way. One will recognize that "memory" is one form of a "storage" and that the terms may on occasion be used interchangeably.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any term discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

What is claimed is:

1. A method, comprising:
   storing, by a data node of a distributed data processing system, blocks of data on a first data storage system and a second data storage system, the first data storage system to store the blocks of data in a format different from a format of the blocks of data stored in the second storage system;
   identifying, at the data node and based on a data eviction policy, one or more of the blocks of data stored on the first storage system as cold data;
   determining, at the data node, whether the cold data is stored on the second storage system;
   responsive to a determination that the cold data is stored on the second storage system, deleting the cold data from the first storage system;
   responsive to a determination that the cold data is not stored on the second storage system, storing, by the data node, the cold data on the second storage system and evicting the cold data from the first storage system;
   obtaining, at the data node, an object identification (ID) associated with the cold data from the second storage system; and
   storing, by the data node, the object ID of the cold data in the first storage system.

2. The method of claim 1, wherein the first storage system is to exclude that is accessed by one or more clients less than a threshold number.

3. The method of claim 1, wherein the second storage system is to store both non-cold ("hot") data and the cold data.

4. The method of claim 1 further comprising:
   receiving, at the data node, a request to access a block of data; and
   responding, by the data node, to the request by obtaining the block of data from the first storage system.

5. The method of claim 4, wherein responding to the request by obtaining the block of data from the first storage system includes:
   determining, at the data node, whether the block of data is cold data, responsive to a determination that the block of data is cold data, converting, at the data node, the cold data into hot data, and serving, by the data node, the hot data in response to therequest.

6. The method of claim 5, wherein converting the cold data into hot data includes:
   obtaining, at the data node, an object ID of the cold data from the first storage system,
   retrieving, at the data node and using the object ID, the cold data from the second storage system, and
   storing, by the data node, the cold data as the hot data in the first storage system.

7. The method of claim 1, wherein storing the blocks of data in the first storage system in a format different from that of the blocks of data stored in the second storage system includes:
   storing the blocks of data in the first storage system in a format specific to the distributed processing system, and storing the blocks of data in the second storage system in a format not specific to the distributed processing system.

8. The method of claim 7, wherein storing the blocks of data in a format specific to the first storage system includes:
   configuring the first storage system to include multiple volumes, a volume being a data container; and
   configuring the volumes to include segments, a segment formed from a range of bytes within a logical unit number (LUN) constructed from the first storage system, the range of bytes organized as a LUN range to define a location of a segment within the volume.

9. The method of claim 8 further comprising:
   splitting a block of data into chunks, a chunk being a unit of storage in the volume; and storing the chunks in one or more segments of the volume.

10. The method of claim 1, wherein the data eviction policy includes at least one of a least recently used (LRU) policy, a First-in-First-out (FIFO) policy, a least frequently used (LFU) policy, a pseudo-LRU policy, or a segmented LRU policy.

11. The method of claim 1, wherein identifying the cold data includes identifying the cold data in response to a trigger condition.

12. The method of claim 11, wherein the trigger condition includes at least one of (i) a specific time interval, (ii) receipt of new data at the data node, or (iii) an amount of storage space used in the first storage system exceeds a specific threshold.

13. A non-transitory machine readable storage medium storing instructions, comprising machine executable code which when executed by at least one machine, causes the machine to:
   receive, at a data node in a distributed processing system, a request to access a block of data, the block of data stored in at least one of a first storage system or a second storage system; wherein the first storage system and the second storage system is initially to store all blocks of data received from a client of the distributed processing system;
   determine, at the data node, whether the block of data is cold data, the first storage system to exclude cold data and the second storage system configured to store both non-cold ("hot") data and the cold data;
   responsive to a determination that the block of data is cold data, the cold data into hot data, the conversion to obtain, at the data node, an object identification (ID) of the cold data from the first storage system;
   retrieve, at the data node and using the object ID, the cold data from the second storage system; and store, by the data node, the cold data as the hot data in the first storage system; and serving, by the data node, the hot data in response to the request identify, at the data node and based on a data eviction policy, one or more of the blocks of data stored on the first storage system as the cold data, determine, at the data node, whether the cold data is stored on the second storage system, and responsive to a determination that the cold data is stored on the second storage system, delete the cold data from the first storage system; and responsive to a determination that the cold data is not stored on the second storage system, store, by the data node, the cold data on the second storage system;

obtain, at the data node, an object ID of the cold data from the second storage system; and store, by the data node, the object ID of the cold data in the first storage system.

14. A system, comprising:

a first data storage system of a distributed processing system to store blocks of data, the blocks of data including cold data and non-cold ("hot") data, the first storage system to exclude the cold data;

a second data storage system to store the cold data and the hot data;

a data node to read or write the blocks of data from or into the first data storage system and the second data storage system, and to delete the cold data from the first data storage system, the cold data identified based on a data eviction policy, wherein the data node includes a first component having a processor to:

determine whether a block of data requested is stored in the first data storage system, responsive to a determination that the block of data is not stored on the first data storage system, obtain a corresponding object ID of the block of data from the first data storage system, obtain, using the object ID, the block of data from the second data storage system, and write the block of data into the first data storage system.

15. The system of claim 14, wherein the first data storage system is to store the blocks of data in a format specific to the distributed processing system.

16. The system of claim 15, wherein the first data storage system is to include multiple volumes, a volume being a data container, the volumes to include segments, a segment formed from a range of bytes within a logical unit number (LUN) constructed from the first data storage system, the range of bytes organized as a LUN range to define a location of a segment within the volume.

17. The system of claim 16, wherein the data node is further to:

split a block of data into chunks, a chunk being a unit of storage in the volume, and store the chunks in one or more segments of the volume.

18. The system of claim 14, wherein the second data storage system is to store the blocks of data in a format different from that of the blocks of data stored in the first data storage system.

19. The system of claim 14, wherein the data node includes a second component to:

write the blocks of data into the second data storage system, obtain object identifications (IDs) corresponding to the blocks of data, and write the object IDs into the first data storage system.

20. A system, comprising: a processor;

a chunkstore manager that works in cooperation with the processor to store blocks of data at a first data storage system associated with a distributed processing system, the blocks of data including cold data and non-cold ("hot") data, the first storage system to exclude the cold data;

a golden copy manager that works in cooperation with the processor to store the cold data and the hot data at a second data storage system to work with the distributed processing system; and a data node to read or write the blocks of data from or into the first data storage system and the second data storage system, and to delete the cold data from the first data storage system, the cold data identified based on a data eviction policy, the data node to include a component having a processor to determine whether a block of data requested is stored in the first data storage system, responsive to a determination that the block of data is not stored on the first data storage system, obtain a corresponding object ID of the block of data from the first data storage system, obtain, using the object ID, the block of data from the second data storage system, and write the block of data into the first data storage system.

* * * * *